United States Patent

[11] 3,573,592

[72] Inventor Gerald J. Agin
Owego, N.Y.
[21] Appl. No. 850,584
[22] Filed Aug. 15, 1969
[45] Patented Apr. 6, 1971
[73] Assignee International Business Machines Corporation
Armonk, N.Y.

[54] SINGLE STEP STEPPING MOTOR CONTROL
3 Claims, 2 Drawing Figs.
[52] U.S. Cl. .................................................. 318/696
[51] Int. Cl. ............................................... H02p 37/00
[50] Field of Search ......................................... 318/138,
254, 138 (A), 696, 685

[56] References Cited
UNITED STATES PATENTS

| | | | |
|---|---|---|---|
| 3,328,658 | 6/1967 | Thompson | 318/138 |
| 3,345,547 | 10/1967 | Dunne | 318/138 |
| 3,386,018 | 5/1968 | Smith - Vaniz | 318/138 |
| 3,423,658 | 1/1969 | Barrus | 318/138 |
| 3,443,181 | 5/1969 | Kozol et al. | 318/138 |
| 3,466,520 | 9/1969 | Aylinkci et al. | 318/138 |

Primary Examiner—G. R. Simmons
Attorneys—Francis V. Giolma and Hanifin and Jancin ABSTRACT: Nonoscillatory single step operation of a stepping motor is obtained by using the usual drive triggers to start the step operation, and using gating circuits therewith to obtain a one step-backward function logically from the trigger outputs and a Stop single shot for terminating the single step operation.

Patented April 6, 1971  3,573,592

INVENTOR.
GERALD J. AGIN

BY Francis V. Giolma
ATTORNEY

SINGLE STEP STEPPING MOTOR CONTROL

FIELD OF INVENTION

This invention relates generally to stepping motor control systems and it has reference in particular to a control system for obtaining nonoscillatory single step operation of a stepping motor.

DESCRIPTION OF THE PRIOR ART

Heretofore, nonoscillatory single step operation of stepping motors has been effected by using bidirectional trigger rings and operating them to advance the ring one step at the start of an increment to accelerate the motor, retreating the ring one step at the midpoint of the increment to decelerate the motor, and then finally advancing the ring one step to hold the motor in its new position.

SUMMARY OF THE INVENTION

Generally stated, it is an object of this invention to provide an improved single step control system for a stepping motor.

More specifically, it is an object of this invention to provide for using a trigger ring to advance a stepping motor and to use logic circuits therewith to gate the output of the ring to obtain a one step-backward function without having to reverse the operation of the triggers.

Another object of the invention is to provide for using a Stop single shot to gate the outputs of a pair of triggers for obtaining a one step-backward output without having to reverse or effect further operation of the ring.

Yet another object of the invention is to provide a single step operating circuit for a stepping motor which utilizes a minimum of circuit components.

It is also an object of this invention to provide a simple and effective circuit for effecting reliable, high speed, single step operation of a stepping motor in a carriage drive or the like.

It is also an object of the invention to provide for gating the outputs of a trigger ring to obtain a one step-backward function during a forward step of a stepping motor, so as to obtain fast and reliable nonoscillatory stepping motor operation without requiring the use of expensive bidirectional triggers.

In practicing the invention in one of its forms a pair of triggers are connected in a gray code counter circuit to advance in response to a GO input signal, and control drivers for sequentially changing the connections of the two phase windings of a stepping motor to effect energization thereof to provide a one step-forward increment function. A Stop single shot then gates the outputs of the triggers to provide for changing the connections of the windings to effect a one step-backward function for decelerating the motor during the forward increment, followed by a return to the original or normal step function connection to hold the motor in its single step advanced position.

DESCRIPTION OF A PREFERRED EMBODIMENT

Figure 1:
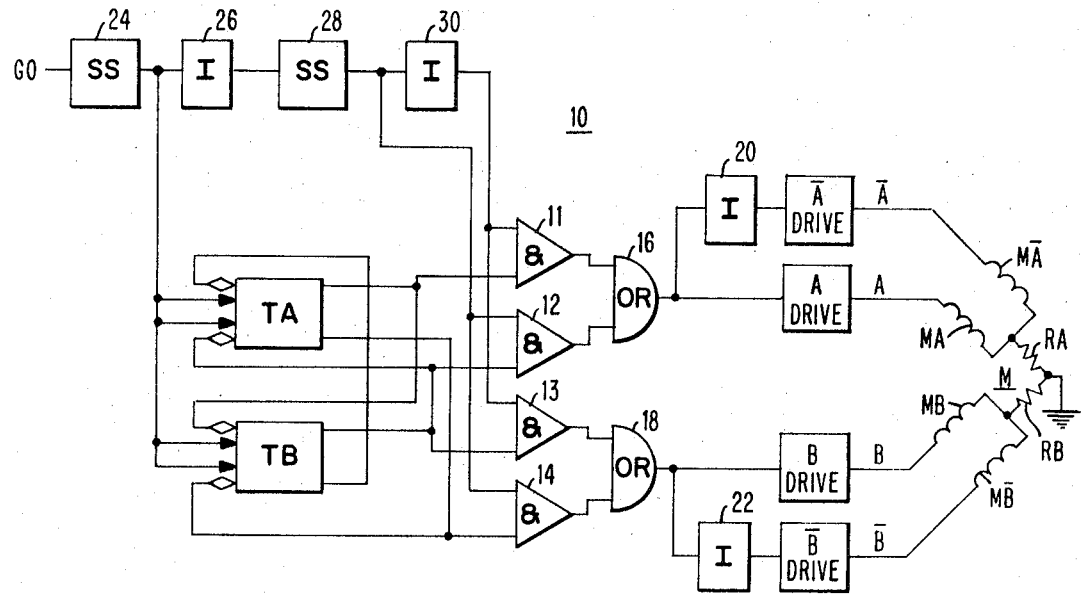
FIG. 1 is a schematic circuit diagram of a single step control circuit for a stepping motor.

Referring particularly to FIG. 1 of the drawing, the reference numeral 10 denotes generally a control circuit for a stepping motor M having phase windings $M\bar{A}$, MA, MB, and $M\bar{B}$, respectively. The motor M may be generally of the type described in paper 61-650 recommended by the AIEE Industrial Control Committee and presented at the AIEE Northeastern District meeting, Hartford, Conn., May 17—19, 1961, by Arthur E. Snowdon and Elmer W. Madsen, entitled "Characteristics of a Synchronous Inductor Motor," and in particular of the bifilar type shown in FIG. 10 of said paper.

The windings $M\bar{A}$ and MA are connected together at one end, and are connected by means of a resistor RA to one terminal, for example, the ground terminal of a suitable source of electrical energy. The windings MB and $M\bar{B}$ are similarly connected at one end by a resistor RB to the same terminal of the source. The other ends of the windings are connected by means for drivers $\bar{A}$, A, B, and $\bar{B}$ to the other terminals of the source, comprising a pulse source such as, for example, a pair of bidirectional switch devices such as triggers TA and TB, which are connected in a well-known configuration to sequentially provide different output levels to effect energization of the windings $M\bar{A}$, MA, MB, and $M\bar{B}$ in a well-known stepping manner is response to GO signals, for example.

Instead of having the triggers TA and TB connected directly to the drivers, and connected to be driven either by feedback pulses or by a separate pulse source such as an oscillator or the like, a plurality of AND circuits 11, 12, 13, and 14 are used to gate the outputs of the triggers TA and TB and apply the outputs thereof through OR circuits 16 and 18 to the drivers $\bar{A}$, A, B, and $\bar{B}$ in conjunction with inverters 20 and 22. A single shot 24 is provided for furnishing an output pulse of timed duration in response to GO signals for advancing the triggers for effecting single step operation of the stepping motor M. The output of the single shot 24 is applied directly to the set and reset inputs of the triggers TA and TB, and is also applied through an inverter 26 to a Stop single shot 28, which in conjunction with an inverter 30 provides gating signals for the outputs of the triggers TA and TB in the ANDs 11 through 14.

Figure 2:
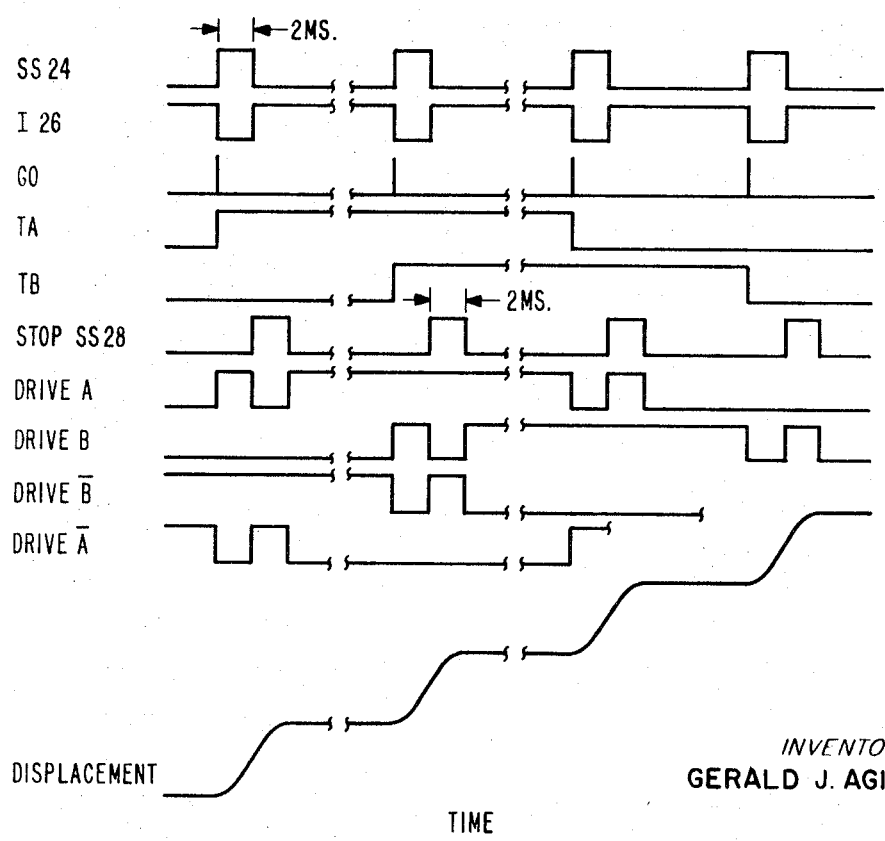
FIG. 2 shows a plurality of timing curves and a displacement curve illustrating the operation of the circuit of FIG. 1 in controlling stepping motor for single step operation.

Referring to the circuit diagram of FIG. 1 in conjunction with the timing chart of FIG. 2, with both the triggers TA and TB initially off, ANDs 11—14 are off, as are ORs 16 and 18. Inverters 20 and 22 are on, so that it will be seen that drive $\bar{B}$ and drive $\bar{A}$ will be on, energizing the motor windings $M\bar{B}$ and $M\bar{A}$. When a GO pulse occurs, single shot 24 turns on to provide a pulse of predetermined timed duration. This advances the triggers by turning on the trigger TA, being gated by the OFF output from trigger TB. Single shot 24 turning on, turns off the output of inverter 26. Inverter 26 being off, single shot 28 is off and the output of inverter 30 is up. Since AND 11 responds to the outputs of trigger TA and inverter 30, the output of AND 11 will rise. This causes the output of OR 16 to rise, turning on driver A to energize the winding MA of the motor M and turning off the output of inverter 20 to deenergize driver $\bar{A}$, commencing a one step-forward increment function of the motor M.

After an interval determined by the duration of the single shot 24, which can, for example, be on the order of 2 milliseconds, the output pulse thereof terminates, and the output of the single shot 24 drops to zero. The output of the inverter 26 rises and fires the single shot 28, causing the output of the inverter 30 to fall. The output of the AND 11 follows the output of the inverter 30 and falls to zero for the duration of the timing of the single shot 28, which can likewise have a duration on the order of 2 milliseconds. The output of the OR 16 follows the output of the AND 11, and falls, as does the output of the driver A. The output of the driver $\bar{A}$ is the inversion of the output of the driver A and rises. At the termination of the output from the Stop single shot 28 the output of inverter 30 rises again. The output of AND 11 rises, as does that of OR 16. The output of driver A rises, and the output of driver $\bar{A}$ falls again. It will thus be seen that for a single GO pulse the output of the driver A rose with the output of the single shot 24 and fell with rise of the output of the Stop single shot 28, rising again at the end of the OFF time for the inverter 30, to provide a one step-forward function followed by a reverse or one step-backward function to decelerate the motor, followed by a return to the original one step-forward function, thus effecting a nonoscillatory single step operation of the motor. The B driver remained off and the $\bar{B}$ driver on, for the duration of the described sequence.

With a subsequent or next GO pulse at some later time the single shot 24 is again turned on, while the inverter 26 turns off, and the Stop single shot 28 is turned on when the output of the inverter 26 again rises. The trigger TA remains on, and the trigger TB is turned on by the output of the single shot 24. This causes the output of the driver B to rise for the duration of the output of the single shot 24, and to fall for the duration of the OFF interval of the inverter 30, at which time it rises again to hold the motor in an advanced step position as shown by the timing curves. The driver B̄ follows the inversion of the driver B for this sequence.

From the above description and the accompanying drawing it will be seen that this invention provides a simple and effective single step control circuit for the stepping motor, which provides a forward step function, followed by a one step-backward function while the trigger ring remains in the forward step function condition, and a return to the original forward step function condition, without requiring reversal of the output of the triggers. By utilizing logical AND circuits to gate the outputs of the drive triggers TA and TB in the manner hereinbefore described, a reliable and inexpensive nonoscillatory single step drive circuit for a stepping motor is obtained. Complicated and expensive reversible triggers are not required, and the control circuit is greatly simplified with a corresponding resultant reduction in the cost thereof.

I claim:

1. In a control system for a stepping motor having a plurality of pairs of separate phase windings:
    bidirectional switch means comprising a pair of triggers each having ON and OFF outputs connected in a self-gating ring to provide a plurality of output conditions for generating a sequence of output levels in a predetermined relation;
    circuit means including a plurality of AND circuits connecting said ON and OFF outputs of said triggers to said pairs of windings, respectively, for energizing said windings in response to said levels in sequence to cause said motor to advance step by step;
    control means connected to said bidirectional switch means to apply a single signal of timed duration thereto in response to an input signal to advance said bidirectional switch means from one operating condition to another and produce a change in output level to cause the motor to commence a one step-forward function; and
    means including delay means comprising an inverter connected to invert said signal of timed duration and a single shot producing an output pulse having a predetermined duration in response to rise of said inverted input signal connecting said control means and said AND circuits operable to change the connections between said outputs of said bidirectional switch means and said windings to provide a one step-backward function for a predetermined time during said another operating condition of the bidirectional switch means in response to said signal of timed duration, followed by a return to said one step-forward function.

2. The invention as defined in claim 1 characterized by said circuit means comprising OR circuits connecting said AND circuits connected to said ON outputs to one pair of said windings, and connecting said AND circuits connected to said OFF outputs to the other of said pair of windings, and other inverter means connected in circuit relation between each said OR circuit and a corresponding one of said pair of windings connected thereto.

3. The invention as defined in claim 2 characterized by said control means including an additional inverter connected to said triggers and to said delay means for applying thereto a pulse of predetermined duration in response to said input pulse signal.